(12) United States Patent
Kanade et al.

(10) Patent No.: US 8,089,580 B2
(45) Date of Patent: Jan. 3, 2012

(54) ENERGY EFFICIENT TRANSFLECTIVE DISPLAY

(75) Inventors: Udayan Kanade, Pune (IN); Balaji Ganapathy, Atlanta, GA (US)

(73) Assignee: I2iC Corporation, Foster City, CA (US)

( * ) Notice: Subject to any disclaimer, the term of this patent is extended or adjusted under 35 U.S.C. 154(b) by 0 days.

(21) Appl. No.: 11/754,223

(22) Filed: May 25, 2007

(65) Prior Publication Data

US 2008/0002095 A1    Jan. 3, 2008

(30) Foreign Application Priority Data

May 25, 2006 (IN) ............................ 797/MUM/2006

(51) Int. Cl.
*G02F 1/1335* (2006.01)

(52) U.S. Cl. .................... 349/65; 349/64; 349/69

(58) Field of Classification Search ............. 349/69, 349/64, 65
See application file for complete search history.

(56) References Cited

U.S. PATENT DOCUMENTS

| | | | | |
|---|---|---|---|---|
| 5,686,979 A | * | 11/1997 | Weber et al. | 349/96 |
| 6,532,152 B1 | * | 3/2003 | White et al. | 361/692 |
| 6,593,980 B2 | * | 7/2003 | Lee et al. | 349/65 |
| 6,646,636 B1 | * | 11/2003 | Popovich et al. | 345/204 |
| 2002/0163606 A1 | * | 11/2002 | Kitai et al. | 349/98 |
| 2002/0176036 A1 | * | 11/2002 | Kaneko | 349/65 |
| 2004/0246434 A1 | * | 12/2004 | Ohashi et al. | 349/199 |
| 2006/0114371 A1 | * | 6/2006 | Peterson et al. | 349/61 |

FOREIGN PATENT DOCUMENTS

WO  PCT/US2007/069808    5/2008

* cited by examiner

*Primary Examiner* — Michael Caley

(57) ABSTRACT

An energy efficient transflective display system is disclosed. In one embodiment, the system comprises a reflector sheet and a transparent backlight sheet placed in front of the reflector sheet. A display panel is placed in front of the transparent backlight sheet where the display panel has a light valve.

6 Claims, 9 Drawing Sheets

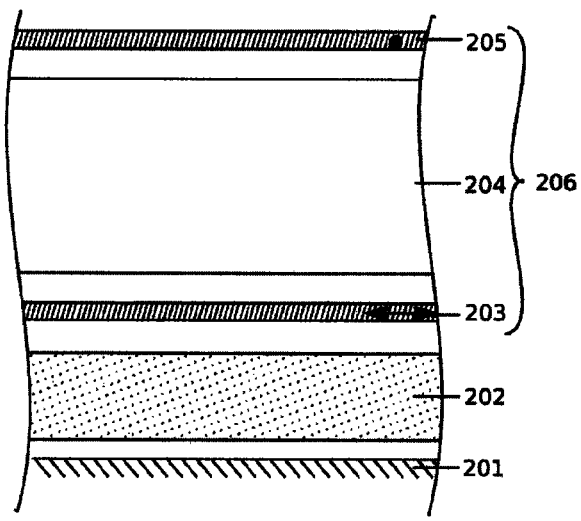
FIG 2A
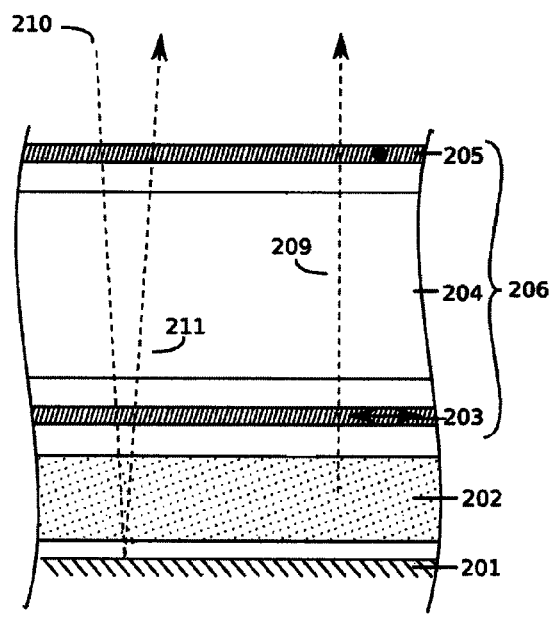 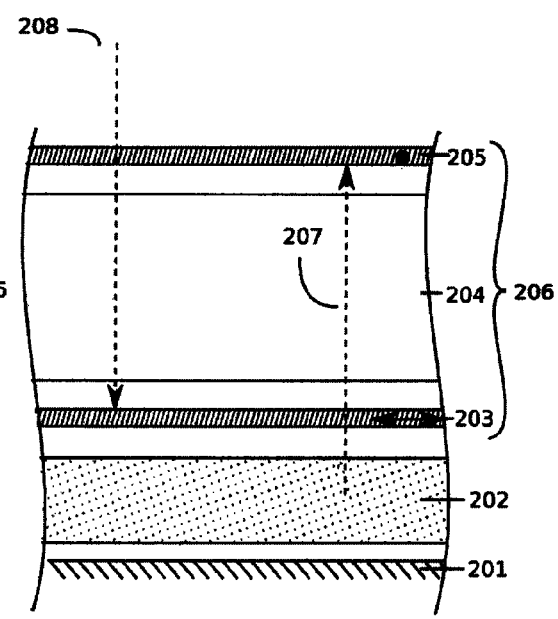
FIG 2B  FIG 2C

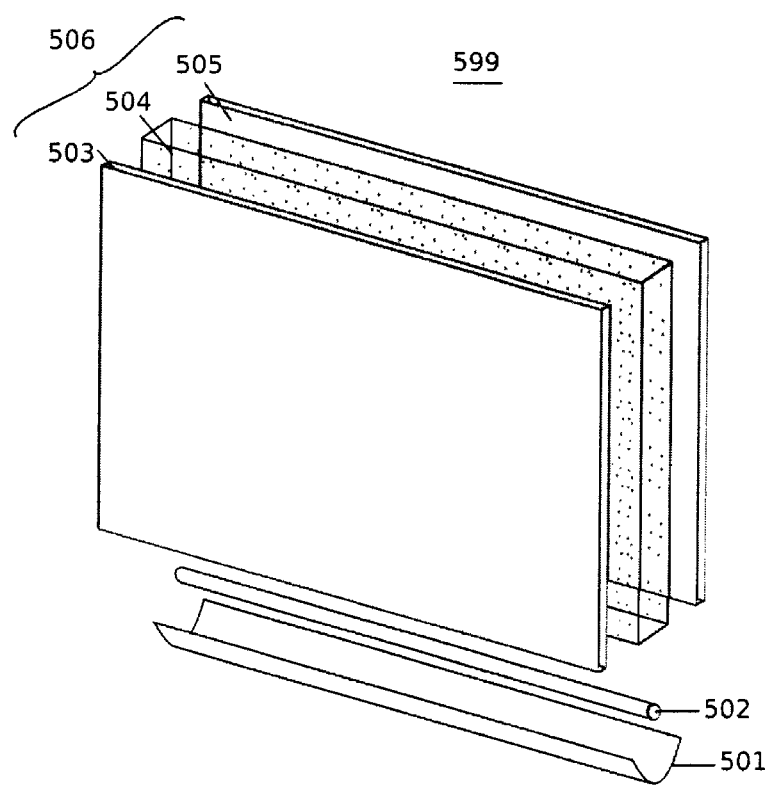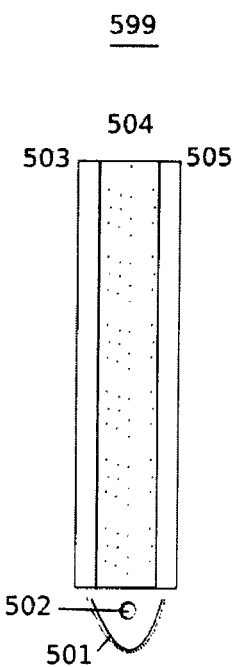
FIG 5A  FIG 5B

ENERGY EFFICIENT TRANSFLECTIVE DISPLAY

The present application claims the benefit of and priority to Indian Provisional Patent Application No. 797/MUM/2006 entitled "ENERGY EFFICIENT TRANSFLECTIVE DISPLAY" and filed on May 25, 2006.

FIELD

The present invention relates to displays. More particularly, the invention relates to an energy efficient transflective display system.

BACKGROUND

A transflective display is a type of display which can be used in both transmissive and reflective modes. In transmissive mode, a backlight is provided which is used to illuminate the display. In the reflective mode, the ambient light is used to illuminate the display. A combination of these two provides the advantage that in areas of low illumination, the transmissive mode can be used, while when there is sufficient light, the reflective mode can be used, which helps in reducing the energy consumption.

FIG. 1 illustrates the cross section of a prior art transflective display system 199. Polarizers 103, 106 are placed in such a way that their transmission axes are aligned at 90 degrees with respect to each other. Polarizers 103, 106, also referred to as crossed polarizers henceforth, and liquid crystal 105 form a light valve. A light valve is a light modulator with controllable transmittance. The display uses a partial mirror 102 which is placed between the bottom polarizer 103 and the backlight 101. Color filter 104 is placed between polarizer 103 and liquid crystal 105. Mirror 109 is placed behind the backlight 101. The display works in transmissive and reflective modes.

The partial mirror 102 may be a mirror with holes. Alternately, partial mirror 102 may be a transflector. A transflector is an optical sheet designed to reflect as much light as possible incident from one face and to transmit as much light as possible incident from the other face. The transflector may be scattering in nature, to help even illumination.

Prior art systems are inefficient in transmissive and reflective modes. In system 199, in the transmissive mode, backlight 101 emits light 108. Part of light 108 passes through the partial mirror 102 and illuminates the display. The remaining part gets reflected back from the partial mirror. Light reflected back from the partial mirror is not recycled efficiently. Thus the display is inefficient in the transmissive mode. In the reflective mode, ambient light 107 gets reflected from the partial mirror 102 and illuminates the display. However, part of ambient light 107 passes through the partial mirror. Light which passes through the partial mirror is not recycled efficiently. Thus the display is inefficient in the reflective mode.

SUMMARY

An energy efficient transflective display system is disclosed. In one embodiment, the system comprises a reflector sheet and a transparent backlight sheet placed in front of the reflector sheet. A display panel is placed in front of the transparent backlight sheet where the display panel has a light valve.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 2A illustrates an exemplary transflective display system with a transparent backlight according to one embodiment;

FIG. 2B illustrates an exemplary transflective display system with a transparent backlight when the pixel is bright, according to one embodiment;

FIG. 2C illustrates an exemplary transflective display system with a transparent backlight when the pixel is dark, according to one embodiment;

FIG. 5A illustrates a block diagram of an exemplary transparent light source according to one embodiment;

FIG. 5B illustrates a block diagram of an exemplary transparent light source as viewed from the side, according to one embodiment.

DETAILED DESCRIPTION

Figure 1:
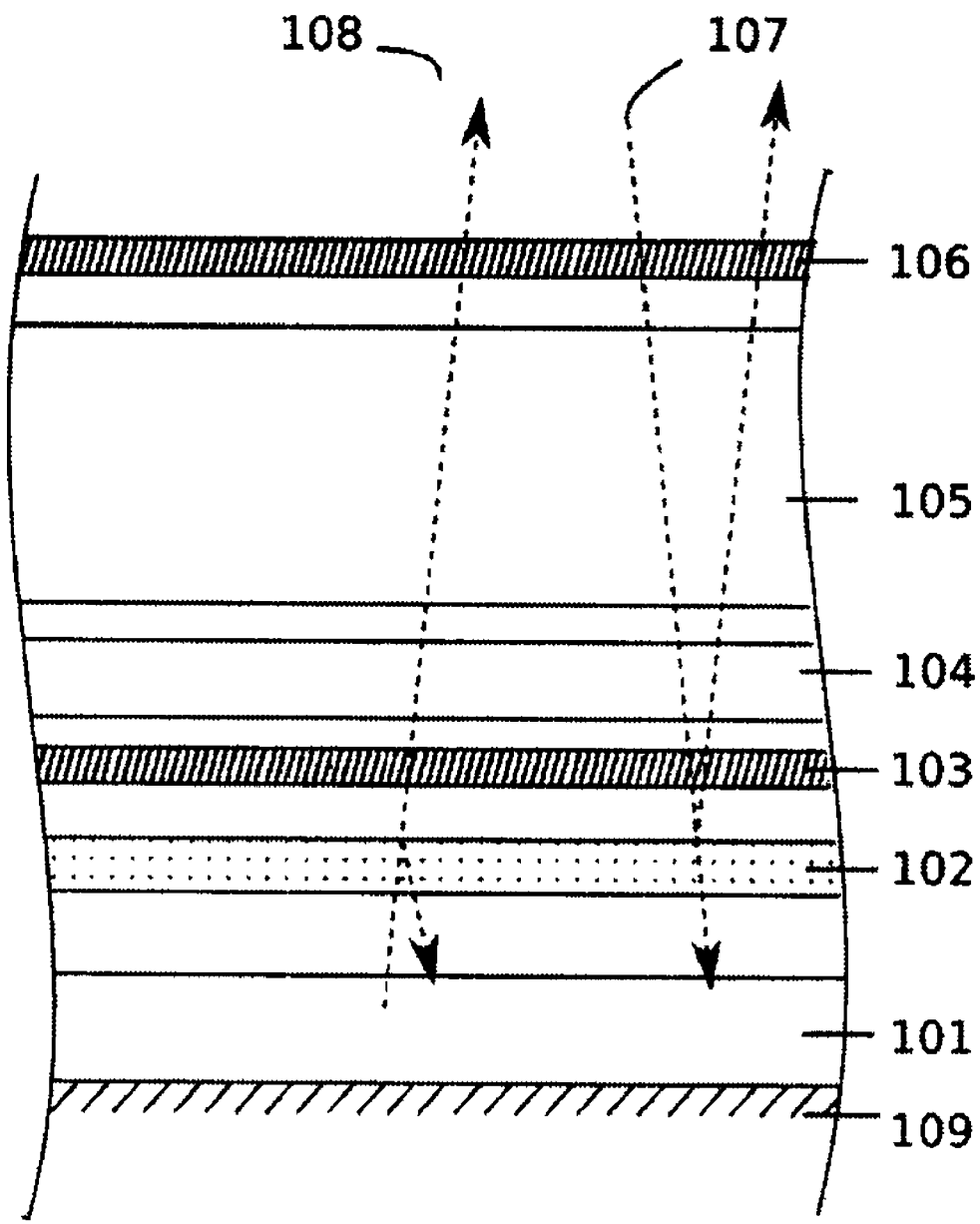
FIG. 1 illustrates a prior art transflective display system which uses a partial mirror.

An efficient transflective display system is disclosed. In one embodiment, the system comprises a reflector sheet and a transparent backlight sheet placed in front of the reflector sheet. A display panel is placed in front of the transparent backlight sheet where the display panel has a light valve.

FIG. 2A illustrates a cross section of an exemplary transflective display system 299, according to one embodiment. A transparent backlight 202 is a transparent light source taking the form of a surface. A mirror 201 is placed behind the transparent backlight. Mirror 201 may be any light reflector, including metallic surfaces, distributed Bragg reflectors, hybrid reflectors, total internal reflectors, omni-directional reflectors or scattering reflectors. Polarizers 203, 205 are oriented such that their transmission axes are aligned at 90 degrees with respect to each other. Polarizers 203, 205, also called crossed polarizers henceforth, and liquid crystal 204 form a light valve 206. Light valve 206 may be configured to be in bright state or dark state. In the bright state of the light valve, both light from the transparent backlight and ambient light illuminate the pixel. In the dark state of the light valve, both the ambient light and light from the transparent backlight is blocked. This is explained below.

FIG. 2B illustrates the cross section of an exemplary transflective display system 299 when the pixel is bright, according to one embodiment. Light 209, emanated from the backlight 202 gets polarized when it passes through polarizer 203. The liquid crystal 204 twists the polarization direction of light 209 by 90 degrees. Since polarizers 205 and 203 are crossed, light 209 passes through the polarizer 205. Thus, light from backlight 202 illuminates the pixel. Ambient light 210 gets polarized when it passes through the polarizer 205. The liquid crystal 204 twists the polarization direction of light 210 by 90 degrees. Since the polarizers 205 and 203 are crossed, light enters the transparent backlight through polarizer 203. Since the backlight 202 is transparent, light passes through it and gets reflected from reflector 201. Reflected light 211 passes through polarizer 203 since it is of correct polarization for transmission. The liquid crystal 204 twists the polarization direction of light 211 by 90 degrees. Since polarizers 203 and 205 are crossed, light 211 passes through polarizer 205 and emerges out of the pixel. Thus both backlight 202 and ambient light illuminate the pixel in the bright state of the pixel.

The transflective display system 299 may be used with the backlight 202 turned off, such that it is not emanating any light. The ambient light present still illuminates the pixel. The transflective display system 299 may be used without any ambient light. The backlight 202 will illuminate the pixel in this case.

FIG. 2C illustrates the cross section of an exemplary transflective display system 299 when the pixel is dark, according to one embodiment. Light 207 emanated from the transparent backlight gets polarized due to polarizer 203. The liquid crystal 204 does not affect the polarization state of light 207. Since the polarizers are crossed, light 207 gets blocked by the polarizer 205. Ambient light 208 gets polarized as it passes through polarizer 205. The liquid crystal 204 does not affect the polarization state of light 208. Since the polarizers 205 and 203 are crossed, light 208 gets blocked by polarizer 203. Thus both ambient light and light from the backlight get blocked in the dark state of the pixel.

In another embodiment, in outdoor environments or in places where sufficient ambient light exists, the display is used in a primarily reflective mode. Since both ambient light and light from the backlight 202 illuminate the display simultaneously, light from backlight 202 can be reduced when ample ambient light is present. This helps in saving power consumed by the backlight 202.

In one embodiment, a manual backlight intensity control is provided so that the user can adjust display brightness according to the level of ambient light present to suit his requirement. The manual control may be an electronic hardware control. In another embodiment, the manual control is implemented in software or firmware running on a programmable device connected to the display. In yet another embodiment, the backlight intensity is controlled automatically by software or firmware running on a programmable device connected to the display.

In another embodiment, the ambient light intensity is sensed by sensors and the backlight power is automatically adjusted as a function of this ambient light intensity. The backlight power may be adjusted so as to provide a required illumination intensity.

Ambient light 210 passes through the pixel twice before illuminating the pixel. The light from the backlight 202, however, passes through the pixel only once before illuminating the pixel. For a liquid crystal light valve, the fraction of ambient light 210 reflected back by the system 299 is approximately half the square of the transmittance of the light valve 206. The fraction of light 207 from the backlight 202 which emanates out from the system 299 is approximately half the transmittance of the light valve 206. This is represented mathematically by the equation $L=0.5Af^2+0.5Bf$, where ^ stands for exponentiation L is the illumination intensity of the considered pixel.

A is intensity of ambient light

B is intensity of light from the backlight 202, and f is the transmittance of the light valve 206.

In an embodiment, a given illumination intensity L is achieved by setting the transmittance of the light valve 206 to approximately the value $(-B+\sqrt{B^2+8AL})/2A$, where 'sqrt' is the square root function. The transmittance of the light valve 206 is set by adjusting the excitation voltage of the liquid crystal cell.

In one embodiment, the backlight illumination B is adjusted to be at least (2Lmax-A), where Lmax is the largest required illumination intensity over all pixels. Alternately, the backlight illumination B is adjusted to be at least (2Lwhite-A), where Lwhite is the expected illumination intensity of a completely white pixel.

In one embodiment, color filters are placed between the transparent backlight and light valve. A particular setting of the light valve produces a color picture in transmissive mode as well as in reflective mode.

Figure 3A:
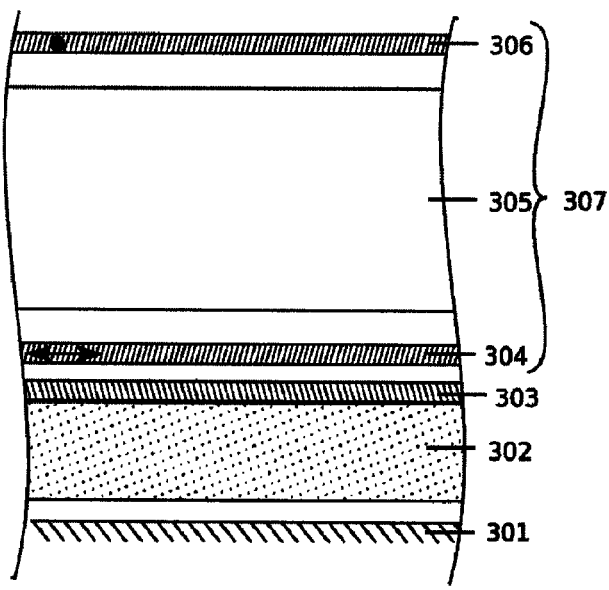
FIG. 3A illustrates an exemplary transflective display system with a transparent backlight and partial mirror according to one embodiment.

FIG. 3A illustrates the cross section of an exemplary transflective display system 399, according to one embodiment. A transparent backlight 302 is a primarily transparent light source in the form of a surface. A mirror 301 is placed behind the transparent backlight. Mirror 301 may be any reflector including those described above in conjunction with FIG. 2A. Crossed polarizers 304, 306 and liquid crystal 305 form a light valve 307. A partial mirror 303 is placed in between polarizer 304 and transparent backlight 302. The display 399 works in both transmissive and reflective modes as explained below. Light valve 307 may be configured to create a bright state or a dark state. In the bright state of the light valve 307, both light from the backlight 302 and ambient light illuminate the pixel. In the dark state of the light valve 307, both the ambient light and light from the backlight 302 is blocked.

Figure 3B:
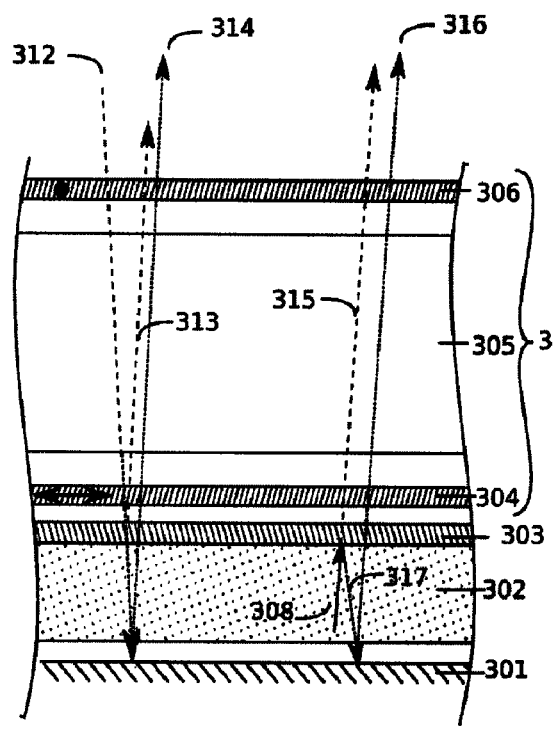
FIG. 3B illustrates an exemplary transflective display system with a transparent backlight and partial mirror when the pixel is bright, according to one embodiment.

FIG. 3B illustrates the cross section of an exemplary transflective display system 399, when the pixel is in bright state according to one embodiment. Unpolarized light 308 from the backlight 302 gets partially transmitted and partially reflected by partial mirror 303. The transmitted part, light 315, passes through the polarizer 304 and gets polarized. Liquid crystal 305 twists the polarization direction of light 315 by 90 degrees. Since the polarizers are crossed, light 315 emerges out from the light valve 307 through polarizer 306. The partially reflected light 317 is efficiently recycled by the transparent backlight 302 as follows. Since the backlight 302 is transparent, reflected light 317 passes through the transparent backlight 302 and gets reflected from mirror 301. Reflected light 317 behaves like light 308. Some part of light 317 gets transmitted by the partial mirror 303 and some part gets reflected. The transmitted part emerges out from the light valve like light 315. The reflected part behaves like light 317. After multiple reflections, almost all light emerges out from the light valve 307. Ambient light 312 enters the light valve 307 through polarizer 306 and gets polarized. Liquid crystal 305 twists the polarization direction of light 312 by 90 degrees. Since the polarizers 304, 306 are crossed, light 312 passes through polarizer 304. Some part of light 312 gets reflected from the partial mirror 303. This reflected light 313 passes through polarizer 304 since it has the same polarization direction as the transmission axis direction of polarizer 304. Liquid crystal 305 twists the polarization direction of light 313 by 90 degrees. As the polarizers are crossed, light 313 emerges out from polarizer 306. The remaining part of light 312 gets transmitted through the partial mirror 303. Since the backlight 302 is transparent, this transmitted light gets reflected from the mirror 301 and emerges out from the light valve 307 like light 308. Thus both backlight 302 and ambient light illuminate the pixel in the bright state of the pixel.

Figure 3C:
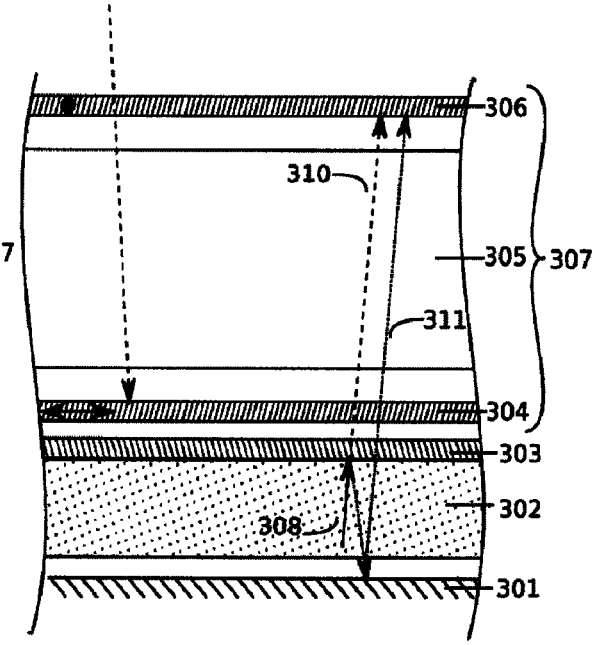
FIG. 3C illustrates an exemplary transflective display system with a transparent backlight and partial mirror when the pixel is dark, according to one embodiment.

FIG. 3C illustrates the cross section of an exemplary transflective display system 399, when the pixel is in dark state, according to one embodiment. Ambient light 309 enters the light valve 307 through polarizer 306 and gets polarized. Liquid crystal 305 does not change the polarization direction of light 309. Since the polarizers are crossed, light 309 gets blocked by polarizer 304. Light 308 from the backlight 302 gets partially reflected from partial mirror 303. Some part of light 308 passes through the polarizer 304 and gets polarized. Liquid crystal 305 does not change the polarization direction of light 311. Since the polarizers are crossed, light 311 gets blocked by polarizer 306. Thus, in the dark state of the pixel, both ambient light and light from the backlight 302 get blocked.

Figure 4A:
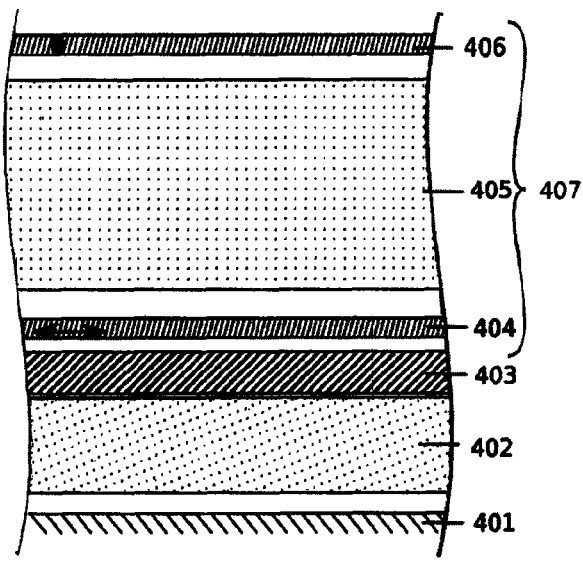
FIG. 4A illustrates an exemplary transflective display system with a multi-colored illuminator according to one embodiment.

FIG. 4A illustrates the cross section of an exemplary transflective display system 499 which uses a multi-colored illuminator, according to one embodiment. A multi-colored illuminator consists of transparent columnar light sources which emit light of more than one distinct spectra. An exemplary column 402 is depicted. Column 402 of a particular color has a color filter 403 of that particular color on top of it. A mirror 401 is placed behind the columnar source. Mirror 401 may be any reflector including those described above in conjunction with FIG. 2A. Crossed polarizers 404, 406 and liquid crystal 405 form a light valve 407. Light valve 407 may be configured to create a bright state or dark state. In the bright state of the light valve 407, both light from the multicolored backlight 402 and ambient light illuminate the pixel. In the dark state of the light valve 407, both the ambient light and light from the multicolored backlight 402 is blocked.

Figures 4B, 4C:
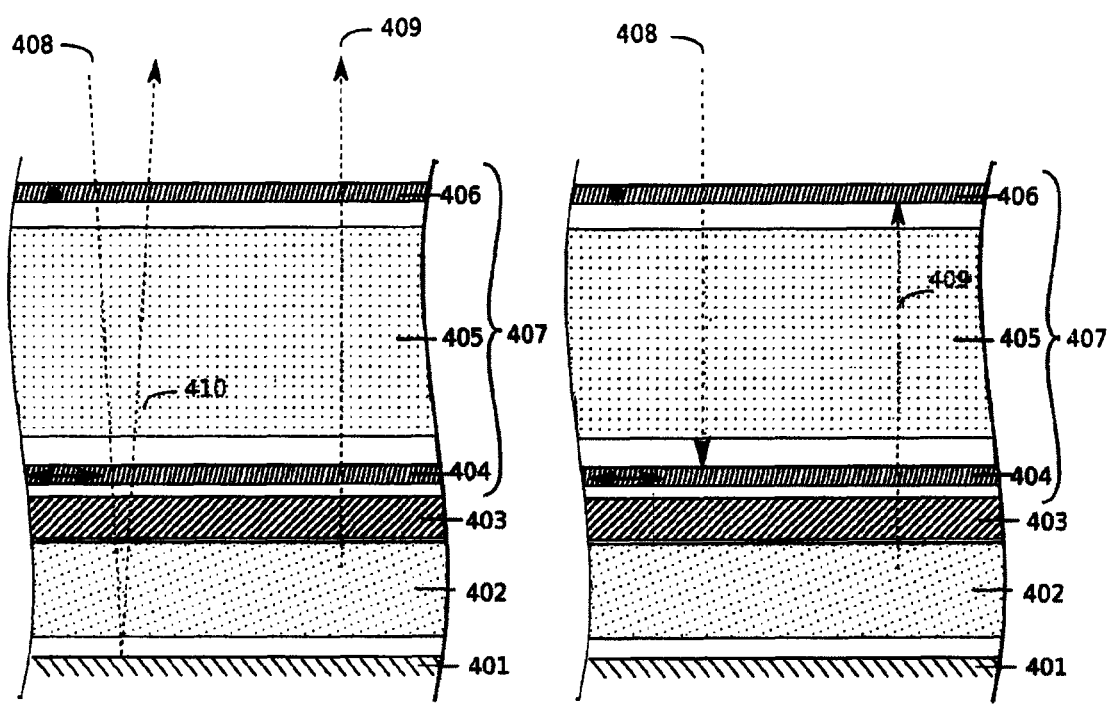
FIG. 4B illustrates an exemplary transflective display system with a multi-colored illuminator when the pixel is bright according to one embodiment.
FIG. 4C illustrates an exemplary transflective display system with a multi-colored illuminator when the pixel is dark according to one embodiment.

FIG. 4B illustrates the cross section of an exemplary transflective display system 499 when the pixel is bright, according to one embodiment. Light 409, emanated from the multicolored backlight column passes through color filter 403 and gets polarized when it passes through polarizer 404. Since the color filter 403 is of the same color as that of the column source, no energy is wasted in the color filter 403. Liquid crystal 405 twists the polarization direction of light 409 by 90 degrees. Since polarizers 406 and 404 are crossed, light 409 passes through the polarizer 406. Thus light from the backlight column illuminates the pixel. Ambient light 408 gets polarized when it passes through the polarizer 406. Liquid crystal 405 twists polarization direction of light 408 by 90 degrees. Since the polarizers 406 and 404 are crossed, light enters the transparent columnar source 402 through the color filter 403. Since the columnar source is transparent, light passes through it and gets reflected from mirror 401. Light 410 passes through polarizer 404 since it is of correct polarization for transmission. Liquid crystal 405 twists polarization direction of light 410 by 90 degrees. Since polarizers 404 and 406 are crossed, light 410 passes through polarizer 406 and the pixel gets illuminated. Since reflected light 410 has passed through the color filter 403, it illuminates the pixel with the correct color. Thus both backlight 402 and ambient light illuminate the pixel in the bright state of the pixel.

FIG. 4C illustrates the cross section of an exemplary transflective display system 499 when the pixel is dark, according to one embodiment. Light 409 emanated from the columnar source 402 passes through the color filter 403 and gets polarized due to polarizer 404. Liquid crystal 405 does not affect the polarization state of light 409. Since the polarizers are crossed, light 409 gets blocked by the polarizer 406. Ambient light 408 gets polarized as it passes through polarizer 406. Liquid crystal 405 does not affect the polarization state of light 408. Since the polarizers 406 and 404 are crossed, light 208 gets blocked by polarizer 404. Thus both ambient light and light from the backlight 402 get blocked in the dark state of the pixel.

In an alternate embodiment, color filter 403 is placed between liquid crystal 405 and polarizer 404. In another embodiment, color filter 403 is placed between liquid crystal 405 and polarizer 406. In yet another embodiment, color filter 403 is placed after polarizer 406.

In another embodiment the color filter 403 is not exactly matched to the color of the columnar source. A broad spectrum color filter, which primarily passes the color of the columnar source is used. Since the color filter is broad spectrum, loss in the color filter in the reflective mode is reduced. Thus the efficiency of the display in the reflective mode improves.

In another embodiment, the color filter 403 is not provided. A particular setting of the light valve 407 produces a color picture in transmissive mode and a gray-scale picture in reflective mode. Ambient light is not wasted in the color filter 403.

Transparent Backlight

FIG. 5A illustrates a block diagram of an exemplary transparent light source 599, according to one embodiment. Light source 599 is primarily transparent and may include a light guide 506 with a core 504 surrounded by low index cladding sheets 503 and 505. The core 504 includes a diffuser, which is a sparse distribution of light dispersing particles. The diffuser in the core 504 is made up of metallic, organic, or other powder, or pigment, which reflects light incident on it. Alternatively, the diffuser in the core 504 may be constituted of small transparent particles or bubbles, which disperse light by refraction, reflection at the boundary, by diffusion inside the particle, or by total internal reflection. Linear light source 502 illuminates the light guide 506 from its edge. Reflector 501 concentrates light from the linear light source 502 into the light guide 506. The light from a primary light source 502 is dispersed over the entire surface of the light guide 506 and exits from its large faces. The light guide 506 is thus primarily transparent and clear when viewed from one of its faces.

FIG. 5B illustrates a block diagram of an exemplary transparent light source 599 as viewed from the side, according to one embodiment. The core 504 is surrounded by low index cladding sheets 503 and 505. Linear light source 502 illuminates the light guide 506 from its edge. Reflector 501 concentrates light from the linear light source 502 into the light guide 506.

Figure 6:
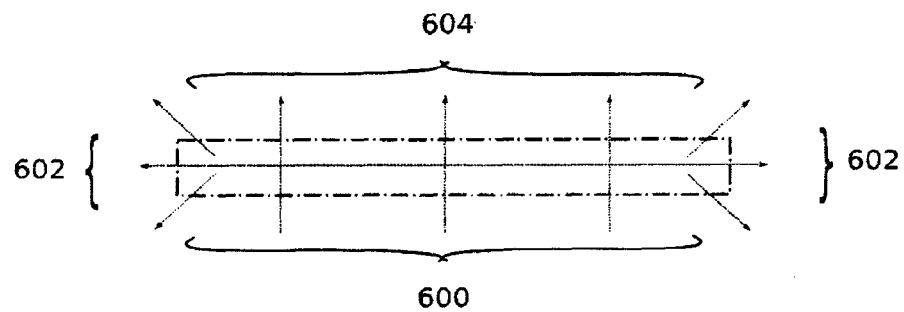
FIG. 6 illustrates a block diagram of an exemplary element of core of an exemplary light source in the form of a surface, according to one embodiment.

FIG. 6 illustrates a block diagram of an exemplary core element 699 of core 504 of a light source in the form of a surface 599, according to one embodiment. Core element 699 has the thickness and breadth of the core 504 but has a very small height. Light 600 enters element 699. Some of the light gets dispersed and leaves the light guide as illumination light 602, and the remaining light 604 travels on to the next core element. The power of the light 600 going in is matched by the sum of the powers of the dispersed light 602 and the light continuing to the next core element 604. The fraction of light dispersed 602 with respect to the light 600 entering the core element 699 is the photic dispersivity of core element 699. The photic dispersivity of core element 699 is in direct proportion to the height of element 699. The ratio of the photic dispersivity of core element 699 to the height of element 699 is a photic dispersion density of core element 699. As the height of core element 699 decreases, the photic dispersion density approaches a constant. This photic dispersion density of core element 699 bears a certain relationship to the diffuser concentration at the core element 699. The relationship is approximated to a certain degree as a direct proportion. The relationship permits the evaluation of the photic dispersion density of core element 699 from the diffuser concentration of that element, and vice versa.

As the height of core element 699 is reduced, power in the emanating light 602 reduces proportionately. The ratio of power of the emanating light 602 to the height of core element 699, which approaches a constant as the height of the element is reduced, is the emanated power density at element 699. The emanated power density at core element 699 is the photic dispersion density times the power of the incoming light (i.e. power of light traveling through the element). The gradient of the power of light traveling through the core element 699 is the negative of the emanated power density. These two relations give a differential equation. This equation can be represented in the form "dP/dh=−qP=−K" where:

h is the height of a core element from the primary light source edge 507

P is the power of the light being guided through that element;

q is the photic dispersion density of the element; and

K is the emanated power density at that element.

This equation is used to find the emanated power density given the photic dispersion density at each element. This equation is also used to find the photic dispersion density of each element, given the emanated power density. To design a particular light source in the form of a surface with a particular emanated power density, the above differential equation is solved to determine the photic dispersion density at each element of the light source, such as the light source 599. From this, the diffuser concentration at each core element of the core is determined. Such a core is used in a light guide, to give a light source of required emanated energy density over the surface of the light source.

If a uniform concentration of diffuser is used in the core, the emanated power density drops exponentially with height. Uniform emanated power density may be approximated by choosing a diffuser concentration such that the power drop from the edge near the light source (such as edge 507) to the opposite edge 508, is minimized. To reduce the power loss and also improve the uniformity of the emanated power, opposite edge reflects light back into the core. In an alternate embodiment, another light source sources light into the opposite edge.

To achieve uniform illumination, the photic dispersion density and hence the diffuser concentration has to be varied over the length of the core. This can be done using the above methodology. The required photic dispersion density is q=K/(A−hK), where A is the power going into the linear light source 604 and K is the emanated power density at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an exemplary light source, H times K is kept only slightly less than A, so that only a little power is wasted, as well as photic dispersion density is always finite.

Figure 7:
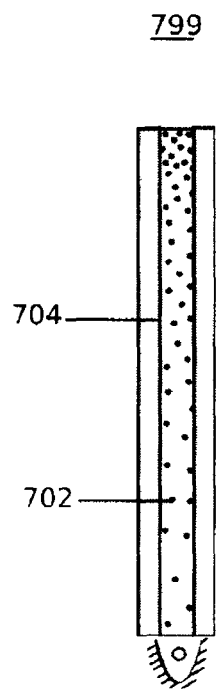
FIG. 7 illustrates a diagram of an exemplary light source in the form of a surface having a varied concentration of diffuser particles, according to one embodiment.

FIG. 7 illustrates a diagram of an exemplary light source in the form of a surface 799 with a core having a varied concentration of diffuser particles, according to one embodiment. The concentration of the diffuser 702 is varied from sparse to dense from the light source end of linear light source column 704 to the opposite edge of core 704.

Figure 8:
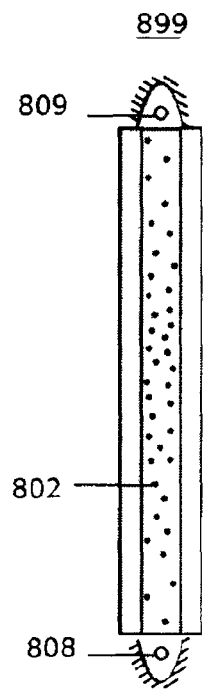
FIG. 8 illustrates an exemplary light source in the form of a surface having two light sources, according to one embodiment.

FIG. 8 illustrates an exemplary light source in the form of a surface 899 having two light sources, according to one embodiment. By using two light sources 808, 809, high variations in concentration of diffuser particles 802 in the core is not necessary. The differential equation provided above is used independently for deriving the emanated power density due to each of the light sources 808, 809. The addition of these two power densities provides the total light power density emanated at a particular core element.

Uniform illumination for light source 899 is achieved by photic dispersion density $q=1/\sqrt{((h-H/2)^2+C/K^2)}$ where sqrt is the square root function, ^ stands for exponentiation, K is the average emanated power density per light source (numerically equal to half the total emanated power density at each element) and C=A(A−HK).

Figure 9:
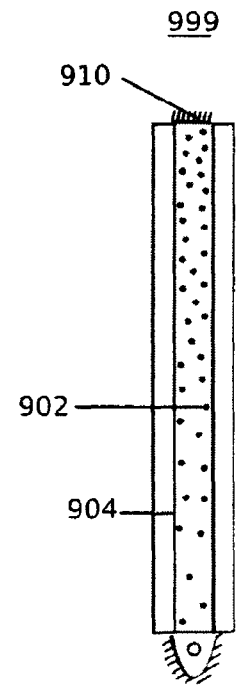
FIG. 9 illustrates a diagram of an exemplary light source in the form of a surface having a mirrored core, according to one embodiment.

FIG. 9 illustrates a diagram of an exemplary light source in the form of a surface 999 having a mirrored core 904, according to one embodiment. By using a mirrored core 904, high variations in concentration of diffuser 902 in the core 904 is not necessary. Top edge of the core 910 is mirrored, such that it will reflect light back into the core 04. The photic dispersion density to achieve uniform illumination in light source 999 is:

$$q=1/sqrt((h-H)^2+D/K^2)$$

where $D=4A(A-HK)$.

For any system described above (such as the light sources in the form of surfaces 799, 899 and 999), the same pattern of emanation is sustained even if the light source power changes. For example, if the primary light source of light source 799 provides half the rated power, each element of the core will emanate half its rated power. Specifically, a light guide core designed to act as a uniform light source as a uniform light source at all power ratings by changing the power of its light source or sources. If there are two light sources, their powers are changed in tandem to achieve this effect.

Multi-Colored Illuminator

Figure 10:
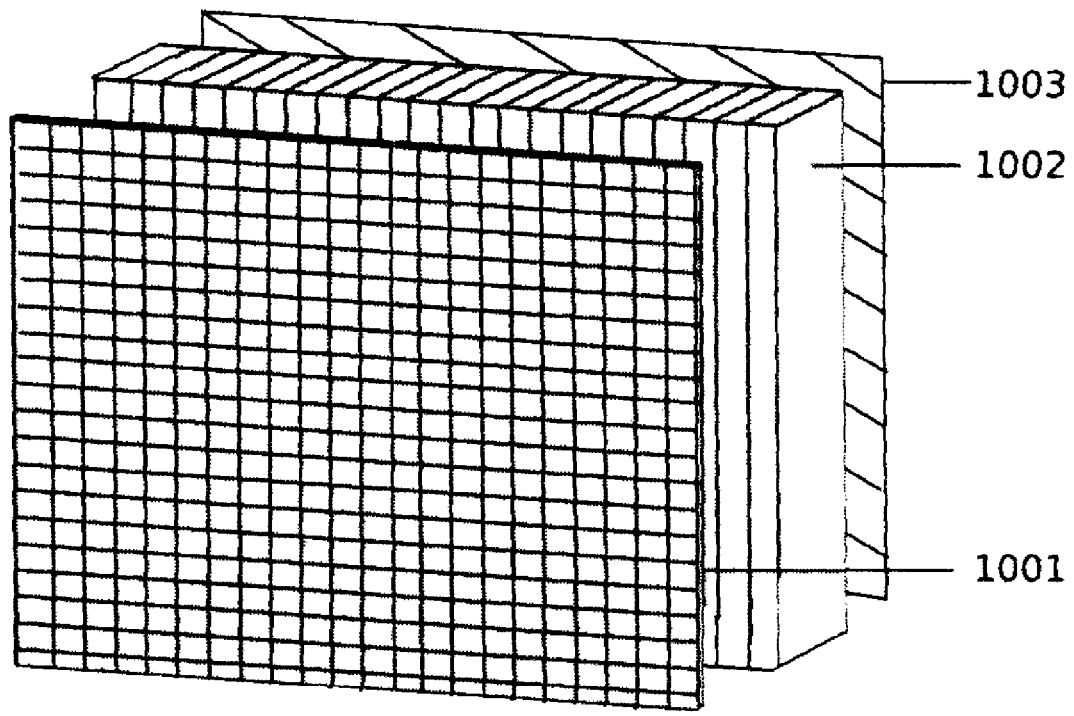
FIG. 10 illustrates a multi-colored backlit system, according to one embodiment.

FIG. 10 illustrates a multi-colored backlit system 1099, according to one embodiment. A multi-colored illuminator system comprises a backlight such that each pixel column of the backlit display is illuminated by light of a particular color. The light illuminating different pixel columns may be of different colors. The columnar light sources 1002 provide illumination for the display. Mirror 1003 is placed behind the columnar sources 1002. Liquid crystal matrix 1001 is placed in front of the columnar sources 1002.

Figure 11A:
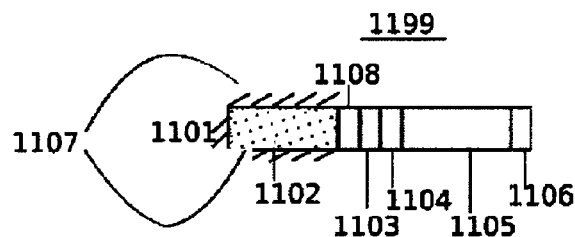
FIG. 11A illustrates a block diagram of an exemplary column of an exemplary multicolor backlit display system as viewed from the top, according to one embodiment.

FIG. 11A illustrates a block diagram of an exemplary column 1199 of an exemplary multicolor backlit display system as viewed from the top, according to one embodiment. Polarizer 1106, liquid crystal 1105 and polarizer 1104 together form a light valve that modulates the intensity of light passing through it. Illuminator column 1102 and cladding sheet 1103 together form a waveguide, illuminator 1102 having higher refractive index than cladding sheet 1103. Color filter 1108 is placed in front of the cladding sheet 1103. Illuminator 1102 has a small concentration of light dispersing particles. Light inside the waveguide undergoes continuous total internal reflection. Back-mirror 1101 reflects light from the back surface. Side-mirrors 1107 reflect light from the side surfaces. Side-mirrors 1107 prevent light from leaking into the adjacent columns. The mirrors 1101 and 1107 may be any light reflector, including metallic surfaces, distributed Bragg reflectors, hybrid reflectors, total internal reflectors, omni-direction reflectors or scattering reflectors.

Figure 11B:
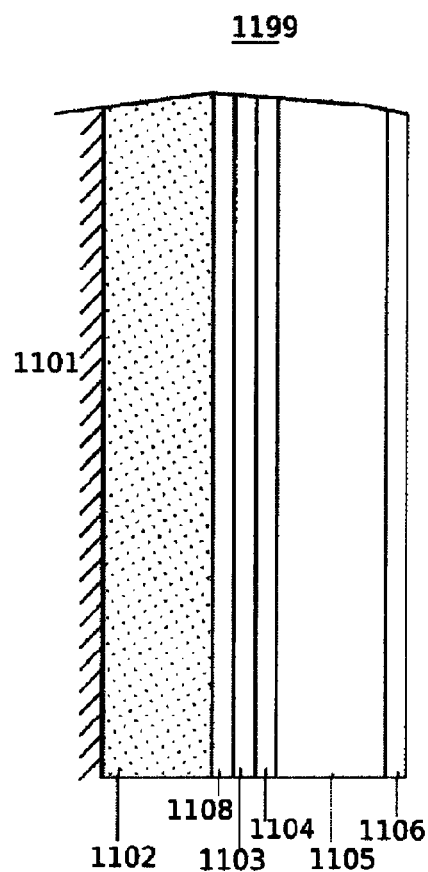
FIG. 11B illustrates a block diagram of an exemplary column of an exemplary multi-colored backlit display system as viewed from the front, according to one embodiment.

FIG. 11B illustrates a block diagram of an exemplary column 1199 of an exemplary multi-colored backlit display system as viewed from the front, according to one embodiment. Polarizer 1106, liquid crystal 1105 and polarizer 1104 together form a light valve that modulates the intensity of light passing through it. Illuminator column 1102 and cladding sheet 1103 together form a waveguide where the illuminator 1102 has a higher refractive index than cladding sheet 1103. Color filter 1108 is placed in front of the cladding sheet 1103. Illuminator 1102 has a small concentration of light dispersing particles. Light inside the waveguide undergoes continuous total internal reflection. Back-mirror 1101 reflects light from the back surface. Side-mirrors 1107 reflect light from the side surfaces. Side-mirrors 1107 prevent light from leaking into the adjacent columns.

Figure 11C:
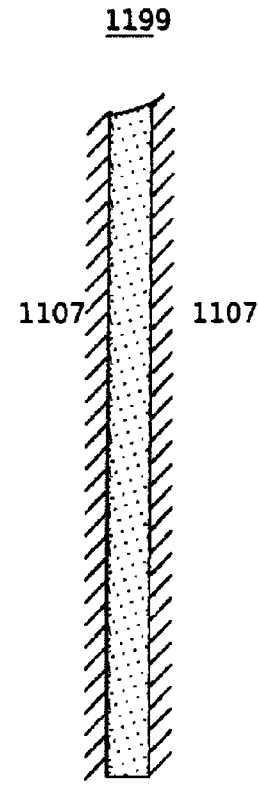
FIG. 11C illustrates a block diagram of an exemplary column of an exemplary backlit display system as viewed from the side, according to one embodiment.

FIG. 11C illustrates a block diagram of an exemplary column 1199 of an exemplary backlit display system as viewed from the side, according to one embodiment. Side-mirrors 1107 prevent light from leaking into the adjacent columns.

Figure 12:
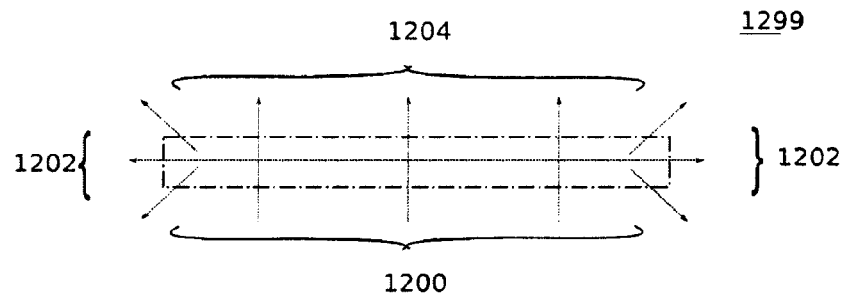
FIG. 12 illustrates a block diagram of an exemplary element of an illuminator column, according to one embodiment.

FIG. 12 illustrates a block diagram of an exemplary core element 1299 of the illuminator column 1102. Core element 1299 has a very small height. Light 1200 enters core element 1299. Some of the light gets dispersed and leaves the light guide as illumination light 1202, and the remaining light 1204 travels on to the next illuminator column element. As has been discussed in conjunction with the core element 699 in FIG. 6, the differential equation pertaining to the columnar source relating the power (P) of light being guided through the core element, the height (h) of the element and the photic dispersion density (q) of the core element 1299 is represented as "dP/dh=−qP=−K" where K is the emanated power density at that core element 1299.

If a uniform concentration of diffuser is used in the illuminator, the emanated power density drops exponentially with height. Uniform emanated power density may be approximated by choosing a diffuser concentration such that the power drop from the end near the light source to the opposite end, is minimized. To reduce the power loss and also improve the uniformity of the emanated power, opposite end reflects light back into the illuminator column. In an alternate embodiment, another light source sources light into the opposite end.

To achieve uniform illumination, the photic dispersion density and hence the diffuser concentration has to be varied over the illuminator surface. This can be done using the above methodology. The required photic dispersion density is q=K/(A−hK), where A is the power going into the illuminator column 1102 and K is the emanated power density at each element, a constant number for uniform illumination. If the total height of the illuminator is H, then H times K should be less than A, i.e. total power emanated should be less than total power going into the light guide, in which case the above solution is feasible. If the complete power going into the light guide is utilized for illumination, then H times K equals A. In one exemplary column, H times K is kept only slightly less than A, so that only a little power is wasted, as well as photic dispersion density is always finite.

Figure 13:
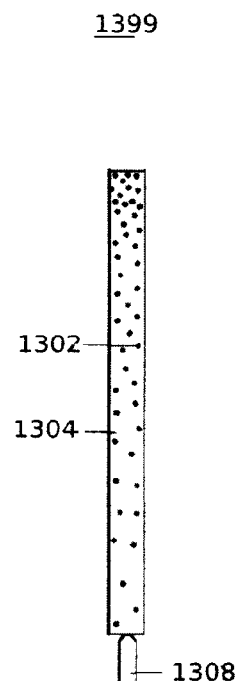
FIG. 13 illustrates a diagram of an illuminator column having a varied concentration of diffuser particles, according to one embodiment.

FIG. 13 illustrates a diagram of an illuminator column 1399 having a varied concentration of diffuser particles, according to one embodiment. Light source 1308 provides light to illuminator column 1304.

Figure 14:
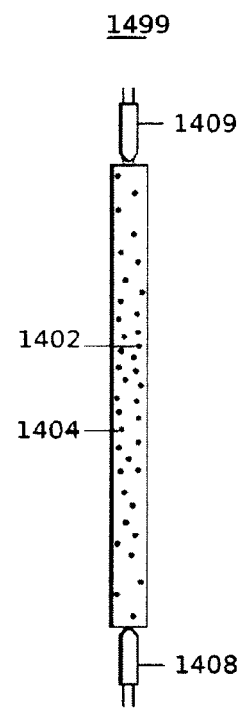
FIG. 14 illustrates an exemplary illuminator column having two light sources, according to one embodiment.

FIG. 14 illustrates an exemplary illuminator column 1499 having two light sources. By using two light sources 1408, 1409, high variations in concentration of diffuser 1402 in the illuminator column is not necessary. The differential equation provided above is used independently for deriving the emanated power density due to each of the light sources 1408, 1409. The addition of these two power densities provides the total light power density emanated at a particular core element.

Uniform illumination for light source 1499 is achieved by photic dispersion density q=1/sqrt((h−H/2)^2+C/K^2) where sqrt is the square root function, ^ stands for exponentiation, K is the average emanated power density per light source (numerically equal to half the total emanated power density at each element) and C=A(A−HK).

Figure 15:
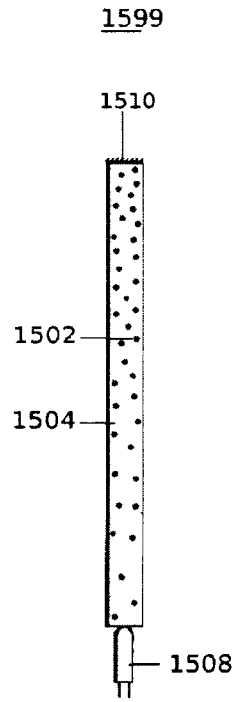
FIG. 15 illustrates a diagram of an exemplary mirrored illuminator column, according to one embodiment.

FIG. 15 illustrates a diagram of an exemplary mirrored illuminator column 1599. By using a mirrored illuminator 1504, high variations in concentration of diffuser 1502 in the core 1504 are not necessary. Top end 1510 of the central illuminator column 1504 is mirrored, such that it reflects light back into central illuminator column 1504. The photic dispersion density to achieve uniform illumination in light source 1599 is:

$$q=1/sqrt((h-H)^2+D/K^2)$$

where $D=4A(A-HK)$.

For any system (such as the light sources in the form of surfaces 1399, 1499 and 1599), the same pattern of emanation is sustained even if the light source power changes. For example, if the light source of illuminator column 1199 provides half the rated power, each element of the core will emanate half its rated power. Specifically, a light guide core designed to act as a uniform illuminator acts as a uniform illuminator at all power ratings by changing the power of its light source or sources. If there are two light sources, their powers are changed in tandem to achieve this effect.

In another embodiment, a light valve comprises a liquid crystal sheet situated between polarizer sheets such that the transmission axes of the polarizers are aligned parallel to each other. The present display technology may be used in conjunction with light valves other than liquid crystal light valves, like electrowetting light modulators.

An energy efficient transflective display system is disclosed. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:

1. An apparatus, comprising
a reflector sheet,
a light source in the form of a sheet that allows ambient light to pass through it placed in front of the reflector sheet, and
a display panel placed in front of the light source in the form of a sheet, the display panel having a light valve; wherein
the light source in the form of a sheet comprises a transparent light guide with a varying concentration of light dispersing particles, and
the transmittance of a pixel of the light valve is approximately set to the value $(-B+\operatorname{sqrt}(B^2+8AL))/2A$ where
'sqrt' is the square root function,
^ stands for the square root function,
B is intensity of light falling on the light valve from the light source in the form of a sheet,
A is intensity of ambient light falling on the light valve and
L is a required illumination intensity of the pixel.

2. The apparatus of claim 1, further comprising color filters.

3. The apparatus of claim 1, wherein the light valve comprises a liquid crystal sheet situated between polarizer sheets.

4. The apparatus of claim 1, wherein the reflector sheet includes one or more of: a metallic surface, a distributed Bragg reflector, a hybrid reflector, a total internal reflector, an omni-direction reflector, and a scattering reflector.

5. The apparatus of claim 1, further comprising a partial mirror sheet placed between the display panel and the light source in the form of a sheet.

6. The apparatus of claim 1, further comprising a manual control that adjusts light source power.

\* \* \* \* \*